United States Patent
Barzegar et al.

(10) Patent No.: US 7,599,356 B1
(45) Date of Patent: Oct. 6, 2009

(54) SYSTEM AND METHOD OF PROVIDING A HIGH-QUALITY VOICE NETWORK ARCHITECTURE OVER IP CENTREX

(75) Inventors: Farhad Barzegar, Branchburg, NJ (US); Irwin Gerszberg, Kendall Park, NJ (US); Thomas W. Hill, Jr., Succasunna, NJ (US); Scott Joseph Mollica, Red Bank, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 513 days.

(21) Appl. No.: 10/978,706

(22) Filed: Nov. 1, 2004

Related U.S. Application Data

(60) Provisional application No. 60/516,927, filed on Nov. 3, 2003.

(51) Int. Cl.
*H04L 12/66* (2006.01)
(52) U.S. Cl. .................. 370/352; 370/259; 370/395.21; 379/201.01; 379/142.16
(58) Field of Classification Search .................. 370/352, 370/259, 395.21; 379/142.16, 201.01
See application file for complete search history.

(56) References Cited

U.S. PATENT DOCUMENTS

| | | | |
|---|---|---|---|
| 5,247,571 A | 9/1993 | Kay et al. | |
| 5,771,279 A | 6/1998 | Cheston, III et al. | |
| 5,915,008 A | 6/1999 | Dulman | |
| 6,122,255 A | 9/2000 | Bartholomew et al. | |
| 6,418,196 B1 * | 7/2002 | Brlenic et al. | 379/32.04 |
| 6,539,077 B1 | 3/2003 | Ranalli et al. | |
| 6,748,057 B2 | 6/2004 | Ranalli et al. | |
| 7,002,995 B2 * | 2/2006 | Chow et al. | 370/485 |
| 7,330,542 B2 * | 2/2008 | Kauhanen et al. | 379/229 |
| 2004/0068668 A1 * | 4/2004 | Lor et al. | 713/201 |
| 2005/0025294 A1 * | 2/2005 | Matsuhashi et al. | 379/88.17 |

* cited by examiner

*Primary Examiner*—Quynh H Nguyen

(57) ABSTRACT

A system and method are disclosed for providing high quality sound communications in an IP Centrex environment. The method aspect of the invention comprises, from a network switch, negotiating between a first customer premises equipment (CPE) and a second CPE, the negotiation being related to a possible quality of a call between the first CPE and the second CPE. Next, the switch controls mapping between a dialing plan and a network address, determining a network address of the first CPE and the second CPE and connecting the call between the first CPE and the second CPE. In this manner, the highest quality and broadest bandwidth possible between the first CPE and second CPE through the IP Centrex environment may be used for the call.

15 Claims, 3 Drawing Sheets

SYSTEM AND METHOD OF PROVIDING A HIGH-QUALITY VOICE NETWORK ARCHITECTURE OVER IP CENTREX

PRIORITY CLAIM/RELATED APPLICATIONS

The present application claims domestic priority to U.S. Provisional Patent Application No. 60/516,928 filed Nov. 4, 2003, the contents of which are incorporated herein by reference. The present invention is also related to Ser. Nos. 10/980,053, 10/980,056, and 10/978,886 the contents of each of these applications is incorporated herein by reference.

BACKGROUND OF THE INVENTION

1. Field of the Invention

The present invention relates to telecommunications systems and methods and more specifically to a high-quality voice network architecture over IP Centrex.

2. Introduction

The present invention relates to how one manages a telephone service. There are a group of well-known telephone service providers and technologies such as the legacy public switched telephone network (PSTN). Newer technologies are enabling telephone service via other networks such as the Internet, packet-switched or wireless networks. One such network is referred to as a "Centrex" solution. The term Centrex relates to a set of business solutions for voice services primarily where the equipment providing call control and service control operations is owned and operated by a service provider and is therefore typically located on a service provider's premises. There are advances to this arrangement. Centrex frees a customer from costs and responsibilities of owning equipment and it can be thought of as an outsourcing solution.

There are basic functions associated with call control and service logic in maintaining a telephone network. The following functions are examples of such services: recognizing that a party is "off hook" and that a dial tone should be provided, interpreting the dialed digits to determine where the call is to terminate, determining whether a party is available, busy, or has call forwarding, applying a busy signal, applying a call waiting tone, delivering a call to voicemail, recognizing when the called party answers the phone and when either party subsequently hangs up, and so forth.

In a traditional Centrex service, such as an analog or IDSN Centrex service, call control and call service logic reside in a class 5 switch located in a central office. A class 5 switch is responsible for transporting and switching the electrical signals that carry the caller's speech or other information.

As mentioned above, packet networks such as the Internet or other IP protocol networks are being used now for voice transmission. These services are often referred to as "IP Telephony". In IP telephony, voice conversations can be digitized and packetized for transmission across the network. The term "IP Centrex" refers to a number of IP telephony solutions where Centrex service is offered to a customer who transmits its voice calls to the network as packetized streams across a broadband access facility. IP Centrex builds on the traditional benefits of Centrex by combining them with the benefits of IP telephony.

One of these IP telephony benefits is increased utilization of access capacity. In IP Centrex, a single broadband access facility is used to carry the packetized voice streams for many simultaneous calls. When calls are not active, more bandwidth is available for high speed data sessions over the LAN, like Internet access. This is a much more efficient use of capacity than traditional Centrex. In analog Centrex, one pair of copper wires is need to serve each analog telephone station, regardless of whether the phone has an active call; one the phone is not engaged in a call, the bandwidth capacity of those wires is unused. An ISDN BRI can support two simultaneous calls (i.e., 128 kbps), but similar to analog lines, an idle BRI's bandwidth capacity cannot be used to increase the corporate LAN's interconnection speed.

In IP Centrex, one customer premises equipment (CPE) communications via the network with another customer premises equipment (CPE) according to typically 4 digit dialing plans. For example, one person within a company may be calling another person within the company using a 4 digit number. Within the CPE-to-CPE context, the network or the class 5 switch typically negotiates a bandwidth of 64 kbps and then goes down depending on the particular compression scheme utilized. The problem with this approach is that the resulting negotiated bandwidth may not provide for a quality voice signal for the communication between users. Thus, although the IP Centrex system is used, the ultimate voice conversation is not achieved with as high a quality as would be desired. The CPE may be any phone or computing device such as a desktop computer that can operate to enable a user to initiate a call to the network and that can perform the steps of the invention.

The reduction in sound quality over the telephone has many downsides. For example, in normal conversation, sounds or portions of words spoken may be dropped or lost via the low bandwidth. These kinds of disturbances hinder the enjoyment of any conversation. In many languages, small sound nuances provide different meanings and any degree of reduced sound quality reduces the capability of hearing and understanding the speaker.

In addition to human-human interaction, the instances of human-computer speech interaction are also increasing. For example, people may call a help line for a business and engage in a human-computer dialog using technology available from AT&T Corp. These speech services include a speech server that includes modules for automatic speech recognition (ASR), language understanding, dialog analysis, and text-to-speech for carrying on a conversation with the user using natural language. These components are known to those of skill in the art. These systems, however, require clean speech from the user to provide accurate and acceptable ASR. With standard telephone speech, however, the low-bandwidth speech, with dropped portions of words transmitted and low quality sound "hear" by the ASR module of a speech recognition system, reduce the capability of the system to engage the user in a normal conversation.

What is needed in the art is an efficient and effective technology for improving the quality of voice and other sounds transmitted over a Centrex based network.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention disclosed herein relates to a high-quality voice network architecture within the context of IP Centrex.

Embodiments of the invention include a system and method for providing high bandwidth communication in an IP Centrex network.

The method aspect of the invention relates to a method for providing high quality sound communications. The method is practiced preferably by a network switch that negotiates between a first customer premises equipment (CPE) and a second CPE, maps between a dialing plan and a network address, determines a network address of the first CPE and the second CPE and connects a call between the first CPE and the second CPE. The negotiation relates to identifying an optimal bandwidth and/or quality of communication between the first CPE and the second CPE given the capabilities of each CPE and the IP Centrex network. In this manner, the optimal quality can be achieved for the resulting call.

Another embodiment of the invention relates to an improved IP Centrex network wherein no bandwidth limitation is imposed on a particular connection that is utilized. There may be a voice connection or a video or multimedia connection.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention provides a high-quality voice network architecture that improves the speech and sound quality in telephone speech. The invention relates to methods, systems and computer-readable media for providing a high-quality voice network. The increased bandwidth can exist over existing copper loops and hybrid fiber and coaxial lines. The improved bandwidth enables greater voice services over standard telephone lines. Where the dynamic range of the signal is expanded according to this invention, voice recognition and TTS techniques are more powerful. Users can hear and understand the other party better than using the tradition low-bandwidth approach.

The development in entertainment technologies (e.g., CD, DVD, MPEG/MP3) include 16 or 24-bit sampling at 44.1/48 kHz and higher. These technologies are becoming more advanced and utilized in the use of music, multimedia and other contexts for the transmission of sound signals. This can improve the frequency response and dynamic range of the transported audio channel. A sampling rate with a higher number of bits per sample can be used to increase the potential dynamic range and expand the frequency response and improve the signal-to-noise ratio. See co-pending and commonly assigned utility patent application Ser. No. 09/694,210, filed on Oct. 23, 2000, the contents of which are incorporated herein by reference.

The high-quality voice network architecture (HQVNA) disclosed herein solves the long-felt industry need to transport a broader audio spectrum using the existing telephone system, eliminating the problem of dropped sound in which individual letters and/or digits are lost in spoken names or numbers during voice transmission. Dropped sound occurs because the full voice spectrum cannot be transmitted over wires using analog technology. This concept provides an innovative approach to delivering voice services in the public switched telephone network (PSTN) by increasing the bandwidth (and therefore the service quality) of voice communications.

Figure 1A:
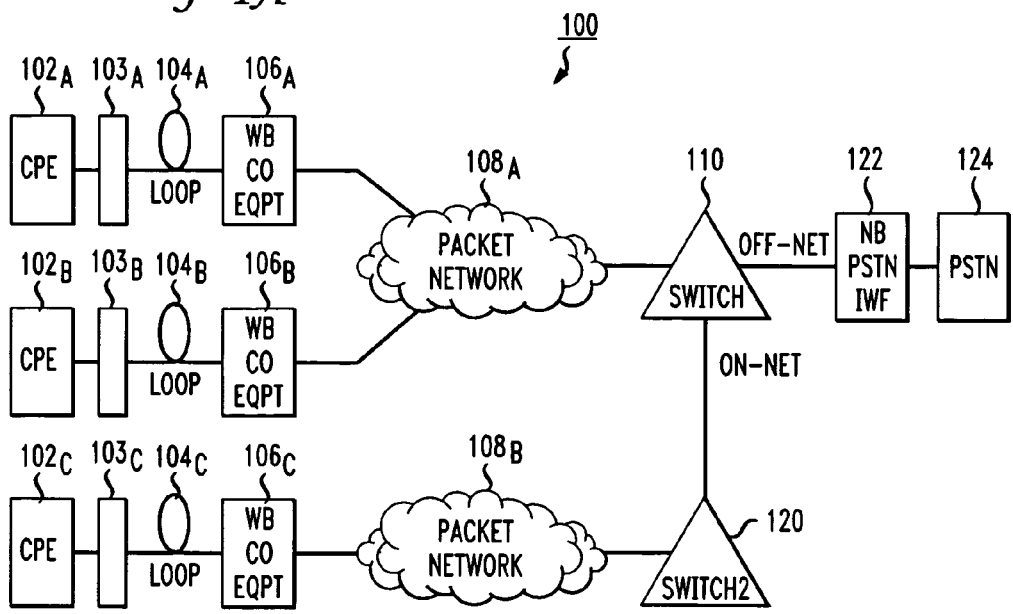
FIG. 1A illustrates an example embodiment of the high quality voice network architecture.

FIG. 1A illustrates the basic system architecture 100 for the HQVNA. This architecture has the ability to provide higher bandwidth between Customer Premises Equipment (CPE) endpoints 102A, 102B, 102C, equal to or greater than 64 Kbps. The CPE may be a computing device of any type of terminal equipment such as a telephone, key system, PBX, modem, video conferencing device, and so forth. This may also refer to connected telecommunications equipment (CTE). The computing device has improved voice codecs that compress voice utterances to CD-like quality in the communications network and represents a fundamental change in the audio quality of signals previously intended for the telephone local loop and PSTN. The improvement using this system is comparable to switching from AM radio quality sound to FM quality sound. This is preferably performed by using improved voice compression codec and compression algorithms at the CPE. For example, the higher quality voice coder may encode a single audio channel at 16 bits per sample with a 48 kHz sampling rate as is used with DVD-quality sound and compressed and transmitted using a 768 kbps transmission rate, which is switched can be switched via conventional circuit or packet technologies (e.g., ISDN, ATM, Ethernet, or IP). The architecture also provides for negotiation between the CPE and a softswitch or other network element so as to enable the architecture to take advantage of the full capabilities of the CPE as well as providing an optimal reception, compression and transmission of voice signals received from a user. The optimal processing of the voice signals based on the negotiation with the network element can be based on the CPE capabilities, a called-party computing device capability (CPE, regular telephone, computer, cellphone, etc.), network capabilities or bottlenecks and so forth.

The HQVNA 100 includes the following elements: a CPE 102A, 102B or 102C for enhanced acoustics connected via a respective local loop 104A, 104B or 104C or other connection to another computing device such as a broadband digital network connection (ISDN, cable, DSL, or the like) 103A, 103B, 103C for communicating with the high-quality voice network or with the local loop 104A, 104B, 104C. The CPE has means for converting the received speech utterance from a user into a wideband signal that is transmitted to the local loop. The local loop transmits the signal to the broadband digital network connection or wideband central office network equipment 106A, 106B, 106C which connects a user to the packet network 108A, 108B. The equipment 106A, 106B, 106C may packetize the signals for transmission to the packet network as well as performing many other functions.

In telecommunications, the local loop is the wiring between the central office and the customer's premises demarcation point. As mentioned above, the telephony local loop connection is typically a copper twisted pair carrying current from the central office to the customer premises and back again. Individual local loop telephone lines are connected to the local central office or to a remote concentrator. Local loop connections can be used to carry a range of technologies, including analog voice ISDN and DSL. The term "local loop" is also sometimes used loosely for any "last mile" connection to the customer, regardless of technology. As technology improves, there is a transition from the lower bandwidth copper twisted pair to higher bandwidth means. This transition will take time but there is a need for wideband communications over the copper twisted pair or other local loop media immediately.

The wideband connection equipment 106A, 106B, 106C transmits data from the respective CPE to a packet network 108A or 108B. The packet network may represent the Internet, an Ethernet network, a wireless network or some other packet network and the like. Although the communication link between the CPE and the equipment 106A, 106B, 106C is shown as the local loop, other means may also be used to communicate between these devices, for example a wideband wireless link or an alternate cable connection or other wideband connection.

Alternate embodiments do not specifically require a packet network but can provide some other type of non-packet network. For example, a system according to this aspect of the invention comprises the use of a circuit such as an ISDN transport as an alternate to a packet transport and switching. This type of system may utilize time domain switching for HQVNA.

Soft switching via softswitch 110 and switch2 120 communicate with the packet network 108A, 108B and the PSTN 124. Soft switching provides programmed switching to go on-net and off-net during the periods of time when the new technology must work with existing technology is also incorporated.

An "on-net" call originating and terminating within the high-quality voice network would flow through the architecture as follows. There is a search for the equivalent to an "off-hook" condition at the CPE 102A, 102B, 102C. Then a process is commenced to seize appropriate resources. Negotiation can proceed between the CPE 102A, 102B, 102C and the switch 110, 120 in terms of what allowable resources are available. For example, the CPE 102A can inform the switch 110 as to the capabilities of the CPE 102A and then CPE 102C can inform switch 120 of its capabilities for a negotiation using CPE 102A, CPE 102C, switch 110 and switch 120 to arrive at an optimal arrangement for transmission of voice signals. The issues for negotiation include, such as, without limitation, what kind of quality the end device can accept, what kind of speaker(s) are available at the CPE, whether the CPE is capable of receiving or transmitting stereo or quadraphonic or 5.1 or 6.1 sound, whether other high-quality or lower-quality parameters have been satisfied, etc. There can be mechanisms provided at the switch and at the CPE for determining the capabilities of the originating element.

A subscription mechanism can also be provided prior to negotiation to initially identify the capabilities of the CPE. The CPE can be associated with authorized users and pre-identified capabilities.

Negotiation between the CPE and the switch can include authentication mechanisms. A determination can also be made as to the type of connection that is being requested and to what destination using conventional means, such as signaling of dialed digits to the switch. The switch can then proceed to negotiate bandwidth to the terminating element. Once the terminating element acknowledges connectivity, the call is established and the signal proceeds through the network.

An "off-net" call originating (or terminating) within the high-quality voice network and terminating (or originating) within the legacy low-quality voice network would similarly flow through the architecture. Where the advanced CPE is talking to legacy CPE, it is advantageous to "downshift" the signal so that the call becomes like any regular call on the legacy network. Alternatively, the above-mentioned switch can be responsible for conversion of the legacy voice signal into a higher-class signal for processing at the advanced CPE.

Where a high quality voice connection has been established, the high bandwidth call can advantageously be mapped to an existing data connection protocol (such as ISDN) so as to effectively use existing hardware capabilities.

The softswitch 110, 120 typically provides for call routing and call state functions and can enable and control connectivity with the packet network 108A, 108B and between the packet network and the legacy PSTN 124. The softswitch includes the capability of negotiating between the CPE and the software regarding the capabilities of the CPE.

Translation between HQVNA encoding and PSTN encoding techniques are performed by a narrow band (NB) PSTN interworking function (IWF) 122, as needed to interwork with the portion of the PSTN limited to DS0-based switching and transport. Associated databases such as the Directory Services and Operator Services are not shown.

The interworking function enables new and different networks to interact with the PSTN. Voice traffic can be coded in different ways in different networks. For example, the GSM standard applies to a mobile network with digital access. Voice coding in GSM gives 13 kbit/s (or half that figure), which must be converted into 64 kbit/s to allow switching in the PSTN. The GSM network performs this code conversion. In ISDN, voice traffic is usually coded in the same way as in the PSTN.

Figure 1B:
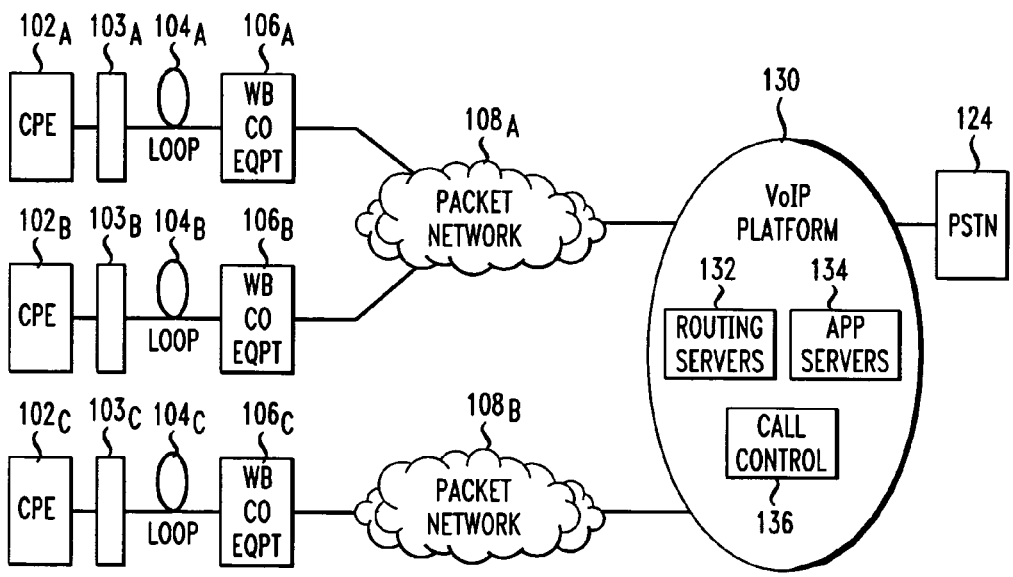
FIG. 1B illustrates another embodiment of the high quality voice network architecture in the Voice over IP context.

While the present invention mainly has applicability to voice communication, its principles will also apply to data communication. In data traffic, different types of interconnection can be used. The PSTN subscriber uses a modem or the like that provides a certain capacity on a line that is either dialed-up or leased. Then, dedicated Pulse-code modulation (PCM) links interconnect the PSTN and the data network. If the data network is packet-switched, as is shown in FIGS. 1A and 1B, an adapting function in the form of a packet assembly/disassembly may be installed at the connection point of the network. Hence, as for fax traffic, the PSTN does not perform any adjustment for data traffic.

FIG. 1B shows architecture related to a Voice over IP context. Here, the CPE, local loop and wideband connection means connect the CPEs to packet networks 108A, 108B. The packet networks communicate with the PSTN via a Voice over IP (VoIP) Platform 130 which includes known features such as routing servers 132, application server 134 and call control modules 136. Each of these VoIP modules communicates with each other to manage and transmit voice communication signals received and transmitted via the platform 130. The VoIP platform 130 communicates with the PSTN 124. In this manner, a user can use the benefits of the high quality voice connection via the VoIP platform to the PSTN 124.

Examples of the CPEs further include a HQVNA-capable media terminal adapter (MTA) and a cable modem in a cable access network. Any device may be used for different access technologies employed to provide the packet network.

Figure 2:
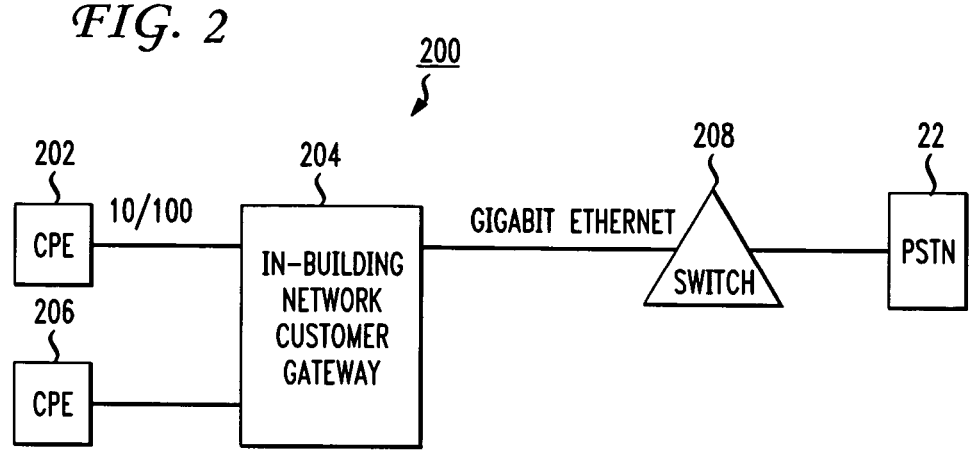
FIG. 2 illustrates a CPE gateway with multiple interfaces.

FIG. 2 illustrates an alternate embodiment of a system 200 associated with a CPE gateway with multiple CPEs 202, 206. This is a layer 2 solution aspect of the invention. The various CPEs 202, 206 communicate with an in-building network 204. The network 204 may be a local area network (LAN) or any other kind of network utilized to connect multiple CPEs 202, 206. The network 204 communicates with a switch 208 via a connection such as a Gigabit Ethernet connection. The switch 208 communicates with the PSTN 22.

Figure 3:
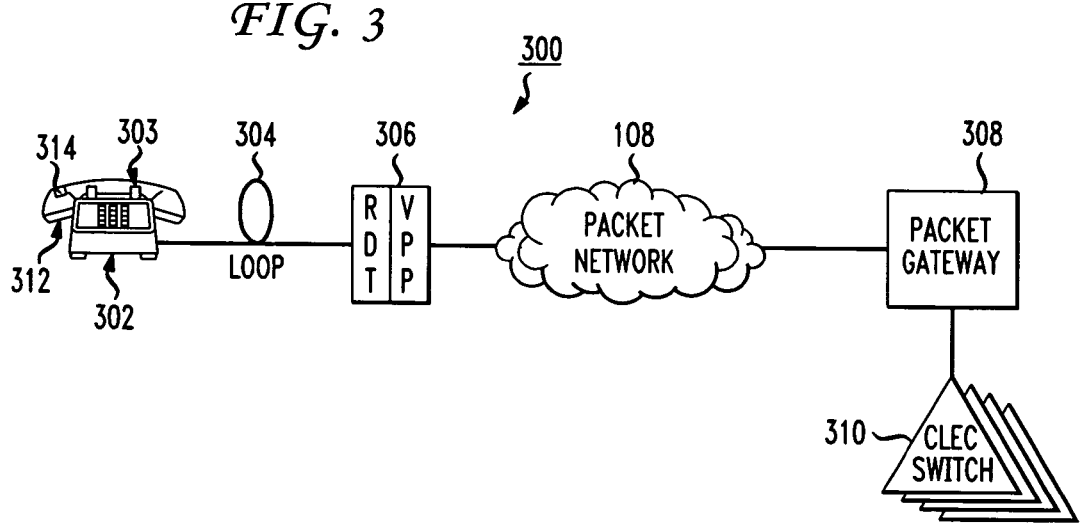
FIG. 3 illustrates electronic loop provisional according to an aspect of the present invention.

FIG. 3 provides another aspect of the invention. Electronic loop provisioning 300 is illustrated in this figure. A telephone or CPE 302 is connected via a local loop or other communication means 304 with a remote digital terminal (RDT) and voice packet processor (VPP) 306. The output from that component 206 is transmitted to a packet network 108 and to a packet gateway 308. The packet gateway is connected to a plurality of the competitive local exchange carrier (CLEC) switches 310.

There are benefits to HQVNA include increased revenue, strategic implementation and the ability to block competitors. Customer retention will also increase through the use of voice telephony over a telecommunications network because of the superior HQVNA voice quality. Cell phone users may also use the HQVNA attractive for calls where higher bandwidth facilities are available (e.g., via a local wireless fidelity or WiFi network). This would eliminate the problem of poor connections, fading speech and dropped connections common to wireless calls. A voice over IP platform may also be used to route packetized signals from the packet network to either the telephone network or another packet network.

Figure 4:
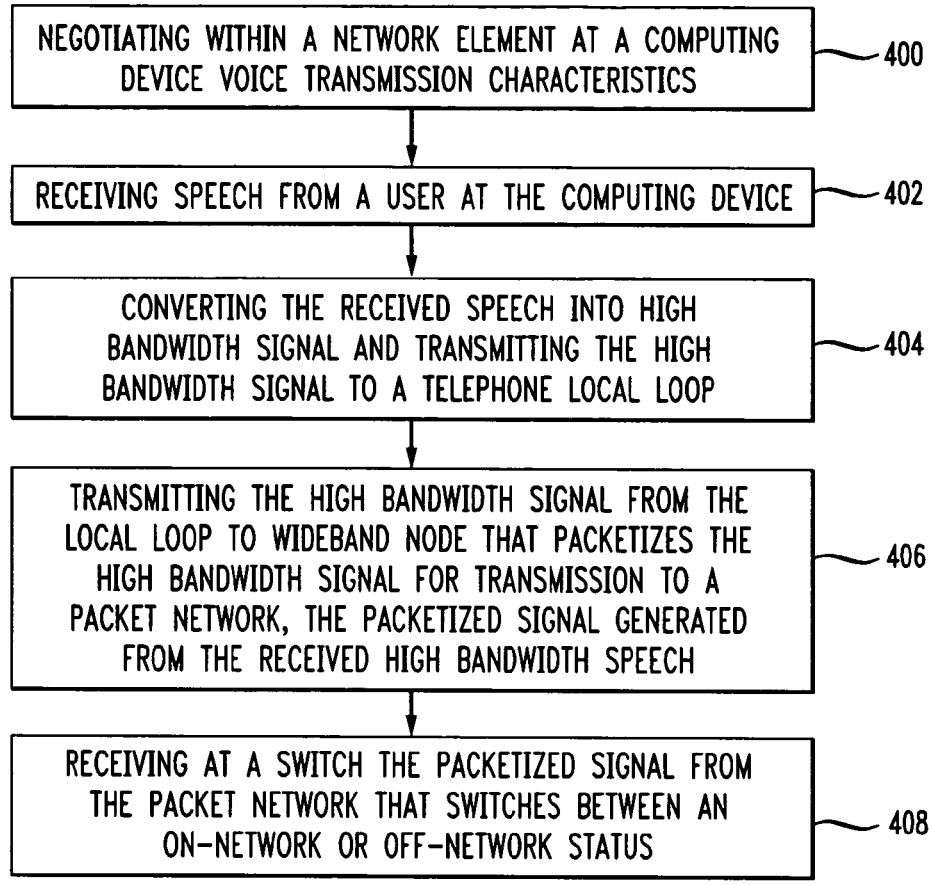
FIG. 4 illustrates a method aspect of the invention.

FIG. 4 illustrates a method aspect of the invention. The method comprises negotiating with a network element at a computing device (such as a customer premises equipment) voice transmission characteristics (400) and receiving speech from a user at the computing device (402). Part of the step of receiving the speech from the user comprises digitizing the received speech into a high quality voice signal utilizing sampling rates greater than 8000 samples per second and/or sample sizes greater than 8 bits per sample. Throughout this disclosure, any reference to speech or voice can also be interpreted as any sound. The network element may be a softswitch, another CPE, or any other network node. An example includes a network node that includes the capability of monitoring the path of a signal from the calling party to the called party and identifying bottlenecks in bandwidth and determining a threshold capability for transmission and negotiating with the CPE to instruct the CPE to receive, code, and transmit the received voice to match the capabilities of the network for that particular call.

The computing device includes a microphone and means for compressing speech into a high bandwidth signal for transmission to the local loop. The computing device also includes the means to negotiate with a network element, such as a softswitch or another computing device or network node, the voice encoding speed, the compression rate and the transmission rate of the audio signal. In this manner, the speech at which the voice data is received, encoded, compressed and transmitted may conform to the capabilities of the network, called party computing device, any bottlenecks in the network, and so forth. The method further comprises converting the received speech into high bandwidth signal and transmitting the high bandwidth signal to a telephone local loop (404) and the like. The next step is transmitting the high bandwidth signal from the local loop to a wideband central office node that packetizes the high bandwidth signal for transmission to a packet network, the packetized signal generated from the received high bandwidth speech (406). Next, a softswitch receives the packetized signal from the packet network that switches between an on-network or off-network status (408).

The CPE 202, 206, shown in FIG. 2, can be implemented in a number of different embodiments. The CPE can be implemented as a customer gateway which performs voice digitization and packetization and converts analog signals into telephony packets. This is depicted abstractly in FIG. 2. A customer gateway 204 has a broadband connection, e.g. using a high-speed packet interface, to a softswitch 208. The customer gateway 204 performs the above-mentioned negotiation with the softswitch 208 and is capable of requesting variable bandwidth, depending on the device supported.

In accordance with an advantageous embodiment, the customer gateway has a number of different interfaces on it. The customer gateway can have a regular plain old telephone service (POTS) line interface. When a conventional telephone, assume CPE 206 is a regular telephone, is attached to the POTS line interface on the customer gateway 204, the customer gateway requests only the 64 kbps bandwidth or less, depending on the codec utilized. The customer gateway 204 also has a high quality voice interface line that, preferably, supports some "plug-and-play" capabilities. A customer would plug in a high quality telephone 202, e.g., one that supports stereo audio, and the customer gateway 204 would detect the capabilities of the device and utilize these parameters in its negotiations with the softswitch 208. The customer gateway should be capable of negotiating with the switch and asking for a higher quality bandwidth.

The customer premises equipment advantageously is not limited to the conventional configuration familiar to all telephony users. In accordance with an embodiment of an aspect of the present invention, the telephony handset 303 shown in FIG. 3 includes a plurality of speaker elements placed in different locations on the handset. The location of the speaker elements is chosen so as to be advantageous for purposes of the customer's auditory experience. For example, and without limitation, in one embodiment, one speaker can be positioned in the traditional "listening" portion of the handset 312 while a second speaker 314 can be positioned on the opposing side of the handset. Alternatively, the speakers can be positioned next to one another but provided with directionality that hits the inside of the customer's ear from different pressure points.

The size and nature of each speaker element does not need to be uniform. For example, and without limitation, one of the speaker elements can act as the equivalent of a bass booster or as a sub-woofer. Different speaker elements, provided with enough bandwidth, can be utilized to reproduce the equivalent of 5.1 or 6.1 sound. It should be noted that the speaker elements provided in the handset should be of sufficient quality to enable the transmission of the high-quality voice signal, unlike the conventional construction of the speakers in a conventional handset.

As discussed above, the particular acoustical capabilities of the customer premises equipment can be negotiated between the customer premises equipment and the network switch.

Another aspect of the invention relates to the use of an intelligent phone. The customer gateway functionality and the telephone set functionality can be combined into a single device, as depicted by 202 in FIG. 2. Unlike IP phones, however, the present embodiment includes a more complicated digitizer and packetizer that supports more higher quality voice and more complicated forms of audio. As mentioned above, the digitizer will digitize a received voice or audio signal into a high quality voice signal utilizing a sampling rate that is at least 8000 samples per second and/or sample sizes greater than 8 bits per sample. Whereas the prior art phone would connect and reserve no more than 64 kbps, the present embodiment can support the reservation of higher bandwidth for increased quality and/or more audio channels, e.g. for stereo sound. The device should have a packet interface to connect directly to the broadband connection and should also include a mechanism for negotiating with the softswitch 208, as discussed above.

It is preferable that the packets exchanged between the customer gateway 204 or the intelligent phone 202 and the softswitch 208 be encrypted. The switch can retain a code that permits law enforcement to tap a connection, pursuant to CALEA restriction.

Another embodiment of the invention relates to the IP Centrex context of the invention. The basic centrex arrangement is discussed in U.S. Pat. No. 5,247,571, incorporated herein by reference, although the '571 patent does not reference the IP aspect of a centrex network. As in a convention IP Centrex, CPE-to-CPE communications can take advantage of shortened (such as 4 digits) dialing plans. These may be used within a business for employees to communicate with each other, for example. Unlike conventional IP Centrex, which typically negotiates a bandwidth or 64 kbps and then goes down to slower connection speeds depending on the particular compression scheme utilized, and other factors that may relate to bandwidth bottlenecks within the network or the technical capabilities of the CPEs or other network elements. The present invention imposes no bandwidth limitations on the particular voice/sound/video or multimedia connection utilized. The network element such as a softswitch will see the dialing plan such as the 4 digit plan and perform a negotiation between a first CPE and a second CPE to determine the advanced capabilities of each CPE. The softswitch acts as an intelligent router or switch that performs a database dip to determine a mapping between the four digit dialing plan and a network address. The network address, which can be, for example, an IP address or a MAC address where in in-building network is an 802.11 network. Based on the negotiation, the softswitch determines which is the end switch and the network address of each of the first CPE and the second CPE. After determining the addresses and the bandwidth necessary for connectivity, the softswitch can then complete and effectuate the call connection.

Another aspect of the negotiation is to identify a possible increased quality for the call. This may involve both identifying the compression, transmission capabilities of the CPEs involved in the call as well as network bottlenecks, pricing plans, modifications that may be made to the network, and so forth to provide optimal quality for the call. The final bandwidth may be further dependent on a security profile of user or the different quality of service levels based on various advanced communication services such as video, high-quality music, telephony voice, telephony video, etc. As the negotiation occurs, the system may draw data from user subscriptions of bundles of services and levels of service (with associated cost increases or breaks) that can be used to negotiate the particular quality of service. A subscriber management server may be used within the network to provide this information and that may be accessible to users to alter their customer/subscriber profile. Such a server may also provide caps on particular services. With regards to a security profile, the system may use a security code wherein the user can confirm that they really want a high quality of service on a subscription basis.

One or more of the CPEs may be an intelligent phone which includes a digitizer and packetizer that supports high quality voice and more complicated forms of audio. This embodiment can support the reservation of higher bandwidth for increased quality and/or more audio channels, e.g., for stereo sound. The intelligent phone will have a packet interface to connect directly to a broadband connection and should also include a mechanism for negotiating with the network element, such as a softswitch or a class V switch. The intelligent phone can be carried about, moved to different rooms and/or plugged into different connections. The network address will follow the intelligent phone around a building as the softswitch mapping will correspond to the intelligent phone's network address. It is preferable that the packets exchanged between the customer gateway or the intelligent phone and the softswitch be encrypted. The switch can retain a code that permits law enforcement to tap a connection, pursuant to CALEA restrictions.

Figure 5:
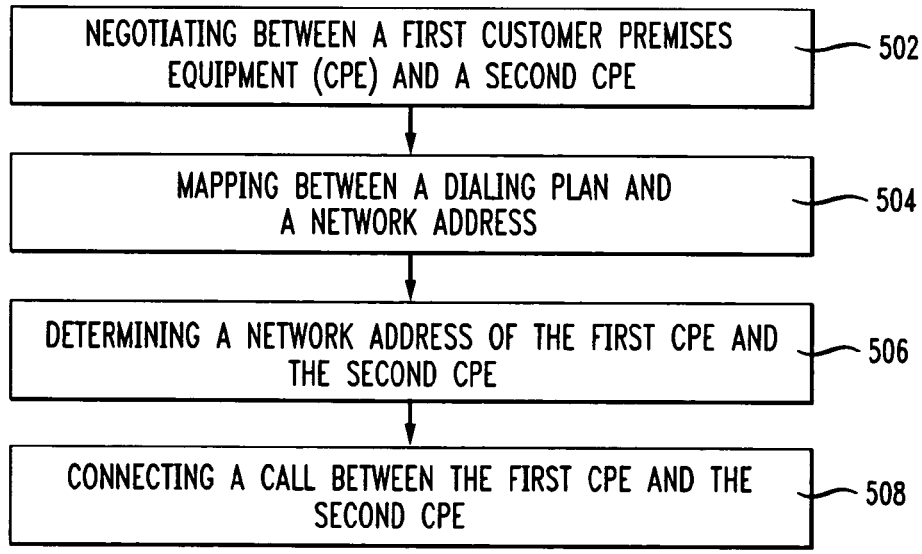
FIG. 5 illustrates another method aspect of the invention related to an IP Centrex network.

FIG. 5 illustrates a method aspect of this embodiment of the invention. The method is preferably practiced by a network element such as a softswitch. The method comprises negotiating between a first customer premises equipment (CPE) and a second CPE (502), mapping between a dialing plan and a network address (504), determining a network address of the first CPE and the second CPE (506) and connecting a call between the first CPE and the second CPE (508). The negotiation analyzes the capabilities of the CPEs on either end of the call and network bottlenecks to identify an optimal bandwidth (and thus quality of service) for the call. The network element also performs a database dip to determine the mapping between the dialing plan and a network address. The network address may be the address of one or both of the CPEs associated with the call.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the system may include a voice over IP component, an asynchronous transfer mode (ATM) component or be used on an Ethernet network. All or a portion of the high bandwidth signal may also be transmitted via a wireless medium via a number of known protocols. As another example, while the specification details the invention in terms of receiving a voice signal at a computing device, the voice signal being digitized and processed, it the present invention is not limited to voice signals. Any sound may be received at a computing device and processed according to the principles of the invention. Therefore, any location where voice or a digitized voice signal is referenced, it may be assumed that any sound may be processed in the same manner within the scope of the invention. Further, the centrex or IP Centrex network may also be a wireless network or other PBX-related network that includes an IP component. Accordingly, the appended claims and their legal equivalents should only define the invention, rather than any specific examples given.

We claim:

1. A system for providing high quality sound communications within an IP Centrex network, the system comprising:
   a processor;
   means for controlling the processor to retrieve a security profile including a security code confirming a quality of service;
   means for controlling the processor to negotiate between a first customer premises equipment (CPE) and a second CPE, the negotiation being related to a possible quality of a call between the first CPE and the second CPE and based in part on capabilities of the first CPE and the second CPE;
   means for controlling the processor to map between a dialing plan and a network address;
   means for controlling the processor to determine the network address of the first CPE and the second CPE; and
   means for controlling the processor to connect the call between the first CPE and the second CPE according to the negotiated quality of the call and the dialing plan mapping, wherein at least one of the first CPE and the second CPE is an intelligent phone and further comprises:
   means for digitizing sound received at the intelligent phone;
   means for packetizing a received signal; and
   means to negotiate with the IP Centrex to connect to the network at rates more than 64 kbps.

2. The system of claim 1, wherein the means for controlling the processor to negotiate further comprises means for controlling the processor to determine the capabilities of the first CPE and the second CPE.

3. The system of claim 2, wherein the connected call between the first CPE and the second CPE is more than 64 kbps.

4. The system of claim 1, wherein at least one of the first CPE and the second CPE is an intelligent phone.

5. The system of claim 1, wherein the system is a switch within a communications network.

6. The system of claim 1, wherein the network address is an IP address.

7. The system of claim 1, wherein the network address is a MAC address.

8. A computer-implemented method for providing high quality sound communications, the method comprising, from a network switch:
   retrieving a security profile including a security code confirming a quality of service;
   negotiating between a first customer premises equipment (CPE) and a second CPE, the negotiation related to a possible quality of a call between the first CPE and the second CPE and based in part on capabilities of the first CPE and the second CPE;
   mapping between a dialing plan and a network address;
   determining a network address of the first CPE and the second CPE; and
   connecting the call at more than 64 kbps between the first CPE and the second CPE according to the negotiated quality of the call and the dialing plan mapping, wherein at least one of the first CPE and the second CPE is an intelligent phone and further comprises:
   means for digitizing sound received at the intelligent phone;
   means for packetizing a received signal; and
   means to negotiate with the IP Centrex to connect to the network at rates more than 64 kbps.

9. The computer-implemented method of claim 8, wherein negotiating between the first CPE and the second CPE further comprises determining the capabilities of the first CPE and the second CPE.

10. The computer-implemented method of claim 8, wherein at least one of the first CPE and the second CPE is an intelligent phone.

11. The computer-implemented method of claim 8, wherein the network address is an IP address.

12. The computer-implemented method of claim 8, wherein the network address is a MAC address.

13. The computer-implemented method of claim 8, wherein negotiating between the first CPE and the second CPE further comprises identifying subscriber data that affects the quality of the call.

14. The computer-implemented method of claim 8, wherein a user can provide a security code associated with a desired quality of service.

15. The computer-implemented method of claim 8, wherein the security profile of at least one user affects the negotiated quality of the call.

* * * * *

UNITED STATES PATENT AND TRADEMARK OFFICE
CERTIFICATE OF CORRECTION

PATENT NO. : 7,599,356 B1  Page 1 of 1
APPLICATION NO. : 10/978706
DATED : October 6, 2009
INVENTOR(S) : Barzegar et al.

It is certified that error appears in the above-identified patent and that said Letters Patent is hereby corrected as shown below:

In Column 1, Line 46, delete "IDSN" and insert -- ISDN --, therefor.

Signed and Sealed this
Seventh Day of August, 2012

David J. Kappos
*Director of the United States Patent and Trademark Office*